United States Patent [19]

Clark, deceased et al.

[11] 4,292,086
[45] Sep. 29, 1981

[54] ALL WEATHER WOOD SEALER AND MARKER

[76] Inventors: Trevor P. Clark, deceased, late of North Vancouver, Calif.; by Constance C. Clark, executrix, 3650 Sunnycrest Dr., North Vancouver, B. C., Canada, V7R 3C6

[21] Appl. No.: 82,888

[22] Filed: Oct. 9, 1979

Related U.S. Application Data

[63] Continuation-in-part of Ser. No. 859,090, Jan. 10, 1978, abandoned.

[30] Foreign Application Priority Data

Mar. 21, 1977 [CA] Canada ................................ 274427

[51] Int. Cl.³ .................. C08L 1/28; C08L 91/06; C08L 93/00; C08L 93/04
[52] U.S. Cl. ..................................... 106/172; 106/17; 106/18.24; 106/173 R; 106/173 RQ; 106/191; 106/193 J; 106/193 P
[58] Field of Search ............ 106/172, 270, 193, 18.24, 106/17, 173 R, 173 RQ, 191; 548/213

[56] References Cited

U.S. PATENT DOCUMENTS

| | | | |
|---|---|---|---|
| 2,359,972 | 10/1944 | De Bell | 106/172 |
| 2,378,714 | 6/1945 | Leatherman | 106/18.24 |
| 2,419,224 | 4/1947 | Millelut | 106/172 |
| 4,169,949 | 10/1979 | Weiler | 548/213 |

*Primary Examiner*—Allan Lieberman
*Attorney, Agent, or Firm*—Klarquist, Sparkman, Campbell, Leigh, Whinston & Dellett

[57] ABSTRACT

An all-weather wood sealing composition is described. This composition can apply an apparently water impervious seal to a surface portion of wood which is dry, wet, or frozen. The composition can be applied under conditions of heavy rain or snow and produces a seal which is not readily removed by immediate immersion in water. The composition may be applied to an end of cut wood to provide a seal which inhibits cracking. When a suitable pigment is contained in the composition, the composition may be applied through a stencil or similar device to provide a water resistant marking on wood.

8 Claims, No Drawings

ALL WEATHER WOOD SEALER AND MARKER

REFERENCE TO OTHER APPLICATIONS

This application is a continuation-in-part of application Ser. No. 859,090 filed Jan. 10, 1978 now abandoned.

FIELD OF THE INVENTION

The present invention relates to an all weather wood sealing composition which can apply an apparently water impervious seal to a surface portion of wood. This seal is not readily removed by immediate immersion in water. The composition may be applied to wet or frozen logs or lumber under conditions of heavy rain or snow. A suitable pigment may be applied to the composition so that the substantially water impervious seal may be used to identify grades or species of wood, or to identify the owner or destination of the wood.

DESCRIPTION OF THE PRIOR ART

At present, there appear to be no commercial compositions or paints available which can be applied to wet or frozen logs or lumber, and which can be subjected to immediate rainfall or immersion in water. Generally, log and lumber markers and end sealers which are applied to dry wood or bark surfaces are readily lost by elution by rain shortly after their application. Such loss of paints may be very costly to the lumber industry, as frequently logs, trees or lumber are sent to the wrong destination. As well, millions of feet of logs or lumber may have to be remarked or resealed, thereby incurring increased labour costs and delays in production.

Plastic tags have also been used to mark logs or lumber. However, these are easily knocked off during handling of the logs or lumber. Such plastic tags are also attractive to crows and seagulls and are often removed by them.

SUMMARY OF INVENTION

The present invention provides for an all-weather wood sealing composition. The composition comprises a water soluble solvent medium comprising an alcohol selected from the group consisting of methanol and ethanol. A water-insoluble sealing means is dispersed in the alcohol for forming a substantially water impervious film over a surface portion of the wood, after application of the composition to such surface portion and dispersion of the alcohol. This sealing means is comprised of an alkyl ether of cellulose. In addition, a water-insoluble wood adhesive means is dissolved in the alcohol for causing the substantially water impervious film formed by the sealing means to adhere to the surface portion of the wood. The wood adhesive means comprises a material selected from the group consisting of wood adhering resins and soaps of wood adhering resins.

The wood adhesive means described above is suitably a material selected from the group consisting of rosin, shellac, benzoin, colophony, copal, damar, and vinsol.

In another aspect of the present invention, an all-weather wood sealing composition is described which comprises 40% to 90% by weight of an alcohol selected from the group consisting of methanol or ethanol. 0.2% to 40% by weight of an alkyl ether of cellulose is dispersed in the alcohol. In addition 2% to 60% by weight of a wood adhesive means is dissolved in the alcohol. This wood adhesive means is selected from the group consisting of wood adhering resins and soaps of wood adhering resins.

Advantageously, in either aspect of the invention described above, the wood adhesive means additionally comprises a sufficient amount of methyl abietate dispersed in said alcohol so as to increase the tackiness and flexibility of the wood adhesive means when in the solid phase. In addition, the alkyl ether of cellulose of which the sealing means is comprised, is usefully comprised of the ethyl ether of cellulose.

The composition beneficially is comprised of the following:
- (i) 2%–60% by weight of the wood adhesive means;
- (ii) 40%–90% by weight of the alcohol;
- (iii) 0.2%–40% by weight of the ethyl ether of cellulose; and
- (iv) 0.1%–15% by weight of methyl abietate.

Additionally, the composition comprises 0.5%–15% hydrophobic silica dispersed in the alcohol. The hydrophobic silica consists of silica which has substantially 0.7 millimol of methyl groups chemically bonded to the silica per 100 sq. meters of surface area of the hydrophobic silica.

As well, the composition beneficially has added thereto 0.2%–30% of a salt of stearic acid. This salt is selected from the group consisting of calcium stearate, aluminum stearate, magnesium stearate and zinc stearate, and is dispersed in the alcohol. In addition, the composition beneficially contains water-insoluble pigment means. The pigment means is dispersed in the alcohol, and is for causing a visible mark on the surface portion after application of the composition to such surface portion and dispersion of the alcohol.

Advantageously, the ethoxy content of the ethyl ether of cellulose is between 45% to 49% by weight, and the pigment means comprises 0.1%–10% by weight of titanium dioxide.

0.001% to 2% by weight of 2-N-octyl-4-isothiazolin-3-one, and 0.1% to 40% by weight of a low viscosity chlorinated paraffin having a chlorine content of 68%–70% by weight are both usefully added to the composition. Both of these compounds are dispersed in the alcohol.

Beneficially, the adhesive means additionally comprises a sufficient amount of a soap of wood adhering resin dissolved in the alcohol so as to increase the adhesion of the wood adhesive means to the surface portion of the wood, after application of the composition to such surface portion and dispersion of the alcohol. Such soap is selected from the group consisting of soaps of rosin, shellac, benzoin, colophony, copal, damar, and vinsol. This soap is advantageously the ammonium soap, with 0.1% to 60% by weight of such soap being dissolved in the alcohol.

DETAILED DESCRIPTION OF THE INVENTION

Preferably, the wood sealing composition contains a pigment so that a visible mark is left on a surface portion of wood to which the composition is applied. Such an embodiment of the invention of this application is produced from the weights and volumes of the substances shown in the following table:

| Component | Weights or Volumes |
|---|---|
| MIRARES Resin | 19.5 kg |

-continued

| Component | Weights or Volumes |
| --- | --- |
| Methanol | 109 liters |
| AEROSIL R-972 | .907 kg |
| Pthalocyanine Blue Pigment | 1.13 kg |
| ETHOCEL (Medium viscosity 45-N type) | 1.70 kg |
| ETHOCEL (Viscosity 10-N type) | 2.84 kg |
| Calcium Stearate | 3.06 kg |
| Ammonium Hydroxide (28% by weight water solution) | 1.075 liters |
| Titanium Dioxide | 2.95 kg |
| Methyl Abietate | 3.69 kg |

MIRARES Resin is a trade mark under which a highly refined grade of rosin is sold. MIRARES is used as a trade mark by Crosby Chemicals, Inc.

AEROSIL R-972 is a trade mark under which a form of hydrophobic silica is sold. AEROSIL R-972 is produced from AEROSIL, the latter being a trade mark under which is sold a very pure form of silicon dioxide aerosol. This aerosol is obtained by flame hydrolysis which produces particles varying in diameter between 10 and 40 mu. The AEROSIL has on each 100 square meters surface area about 0.5 millimol silanol groups and is hence hydrophillic. AEROSIL, dimethyldichlorosilane and steam are pneumatically fed in parallel flow into a fluidized bed reactor heated to about 400° C. by means of an inert gas such as nitrogen. In this process, some 75% of the silanol groups of AEROSIL are chemically reacted with the dimethyldichlorosilane, the resulting product having about 0.7 millimol of chemically combined methyl groups per 100 square meters of surface area. This hydrophobic form of silica is AEROSIL R-972.

ETHOCEL is a trade mark under which the compound ethyl cellulose is sold. "N type" denotes an ethoxy content of 47.5% to 49% by weight. "Viscosity 45" denotes a viscosity of approximately 45 c.p.s. at 25° C. of a 5% solution by weight of ETHOCEL and 80/20 parts by weight of toluene/ethanol. Similarly, "Viscosity 10" denotes a viscosity of approximately 10 c.p.s. of the solution of ETHOCEL previously mentioned at the same temperature.

The methanol incorporated in this embodiment of the composition acts as a water soluble solvent medium. When the methanol contacts water, the molecules of the methanol appear to be rapidly dispersed into the water by violent molecular migration. Thus when methanol is added to water, a homogeneous mixture of methanol with water appears to be formed as a result of this process.

All of the substances in the table above, other than the methanol and ammonium hydroxide, are selected to be water insoluble. All chemical compounds are to some extent soluble in water. However, "water insoluble" in the context of this application implies that the compounds are sufficiently water insoluble so that visible amounts will not be dissolved by water over a period of at least one or two days.

The ammonium hydroxide, although listed under the "components" column of the above table, is unlike the other substances listed under that column in that the present embodiment of this invention does not comprise ammonium hydroxide. The function of the ammonium hydroxide solution is to react with at least a portion of the acids contained in the rosin, thereby producing the ammonium soap of rosin, another component of the present embodiment. This ammonium soap of rosin is also water insoluble.

When this embodiment of the composition is applied to a wet surface portion of wood, the alcohol appears to disperse in the water in the manner described above. This causes the remaining water insoluble compounds in the composition to precipitate. Thus, shortly after the application of the composition to such surface portion of wood, the ethyl cellulose precipitates to form a substantially water impervious film over such surface portion. This film apparently inhibits washing away of the other water insoluble components of the composition by water. Thus, such components can become attached to the surface portion of wood without being affected by rain or immersion of the surface portion in water.

Concurrent with precipitation of the ethyl cellulose, the ammonium soap of rosin and any rosin which has not reacted with the ammonium hydroxide, also precipitate. The precipitate so formed causes the substantially water impervious film formed by the ethyl cellulose to adhere to the surface portion of wood.

The methyl abietate ostensibly increases the tackiness and flexibility of the rosin, or its ammonium soap, when either is in the solid phase. Thus methyl abietate likely assists the water impervious film formed by the ethyl cellulose to adhere to the surface portion of wood to which the composition is applied.

The AEROSIL R-972 seemingly increases the resistance of the rosin and its ammonium soap, and the water impervious film, to elution by water.

As a result of the adhering mechanism outlined above, a seal is applied to the wet surface portion of wood. This seal forms even under conditions of rain or snowfall, and apparently adheres well to such surface portion of wood and does not appear to be removed by immediate or prolonged immersion in water.

When the embodiment described above is applied to a dry surface portion of wood, the substantially water impervious film is formed by the ethyl cellulose after the methanol has dispersed into the atmosphere by evaporation. As the alcohol evaporates, the ammonium soap of rosin and any unreacted rosin will also precipitate and cause the substantially water impervious layer formed by the ethyl cellulose to adhere to the surface portion of wood. The other water insoluble components of this preferred embodiment of the invention will likewise precipitate upon the evaporation of the methanol. Under such conditions, a seal is formed which apparently has substantially the same properties as the seal described above.

This embodiment may also be applied to a surface portion of wood covered with a layer of ice. In such a case a seal is formed in a manner apparently analogous to that which results in a seal when this embodiment is applied to a wet surface portion of wood. The seal formed in this case appears to have substantially the same properties described above.

The pthalocyanine blue pigment and the titanium dioxide which are incorporated in this embodiment cause a visible mark to be left on the surface of wood to which the composition is applied. This mark will be substantially coextensive with the seal formed by the composition. The calcium stearate appears to reduce spreading of the precipitated water insoluble components, and also to inhibit settling and packing of the titanium dioxide when the composition is stored.

In a second embodiment of this invention, the composition is adapted for use as an end sealer, to seal an end of a piece of cut wood. The amounts of each substance required to produce this embodiment of the invention are shown in the following table:

| Component | Weights and Volumes |
| --- | --- |
| MIRARES Resin | 31.0 kg |
| Methanol | 251.0 kg |
| PAROIL 170 LV | 32.0 kg |
| AEROSIL R-972 | 3.0 kg |
| WATCHUNG RED B | 4.0 kg |
| ETHOCEL (Medium viscosity 100-N type | 9.0 kg |
| SKANE M-8 | 0.6 kg |
| Calcium Stearate | 10.0 kg |
| Ammonium Hydroxide (28% by weight solution in water) | 1.0 liter |
| Titanium Dioxide | 1.0 kg |
| Methyl Abietate | 5.0 kg |

PAROIL 170 LV is a trade mark of Dover Chemical Corporation under which is sold a chlorinated hydrocarbon having the following properties:
Average chemical formula: $C_{11}H_{16}Cl_8$
Average molecular weught: 432 grams/mole
Chlorine content: 66% by weight
Viscosity: 75 to 115 c.p.s. at 99° C.

WATCHUNG RED is a trade mark used by DuPont Corporation. WATCHUNG REDS are metal precipitated (calcium, strontium, barium) azo pigments of the beta-hydroxynapthoic acid type derived from the dyestuff Permanent Red 2B.

SKANE M-8 is a commercial grade of 2-N-octyl-4-isothiazolin-3-one. SKANE M-8 is a trade mark of Rohm and Haas Company.

The PAROIL 170 LV is dissolved in the methanol and appears to provide increased adhesion of the substantially water impervious film formed by the ethyl cellulose, to the surface portion of wood. This compound also appears to endow the seal formed on the surface portion of wood with increased water repellency and resistance to fungus growth. WATCHUNG RED B serves the same function as the pthalocyanine blue pigment described above. The SKANE M-8 seemingly provides the seal formed on the surface portion of wood by this second preferred embodiment of the invention, with mildew resistance.

With regard to the ETHOCEL "Viscosity 100" denotes a viscosity of approximately 80–105 c.p.s. at 25° C. of a 5% solution by weight of ETHOCEL and 80/20 parts by weight of toluene/ethanol.

This second embodiment of the invention can be applied to wet or dry surface portion of wood, or a surface portion of wood covered with a layer of ice, and appears to produce a seal in the same manner, and with substantially the same qualities, as the seal formed by the first embodiment of the invention described above. However, the seal formed by the second embodiment appears to retard cracking of the wood, when applied to the cut end of such wood, better than the first embodiment described above. As well, the seal formed by the second embodiment is more resistant to fungi staining, and appears to form a more durable and water repellent seal than the seal formed by the first embodiment of this invention. However the first embodiment described appears to be the preferred composition when the invention is to be used for marking wood.

To produce either embodiment of the invention from the amounts of components described above, the pigments are first added to the methanol and sheared in a Myer's or similar type mixer until the pigment is well dispersed. The MIRARES Resin is then added and stirred until dissolved. The PAROIL 170 LV is then added gradually while shearing until dissolved, followed by the ETHOCEL which is added while shearing until dispersed. The methyl abietate is added gradually, followed by the ammonium hydroxide and other components.

The composition can be applied to the surface portion of wood by means of a trigger type oil can, conventional or airless spray equipment or by aerosol cans. To produce legible markings, the first embodiment described above can be sprayed through a stencil or other similar device.

Other variations of the invention are possible. For example, the methanol can be replaced by ethanol. However, other alcohols, such as isopropanol, were found to be completely ineffective in the present invention. It has also been found that shellac can be used to replace all or part of the rosin, the ammonium soap of shellac replacing at the same time all or part of the ammonium soap of rosin. The seal formed when shellac is used, though, appeared to be less resistant to outdoor exposure.

It is also possible to use other alcohol soluble resins in place of the rosin, such as shellac, benzoin, colophony, copal, damar, or vinsol. As well other modifications of rosin, such as hydrogenated rosin, may replace the rosin in whole or in part. These may replace the rosin either in whole or in part, but appear to produce less satisfactory seals than the rosin. As well, where the composition of the present invention is to be applied to new finished lumber, it is not required to use the ammonium soap of rosin or methyl abietate. However, their inclusion in the composition ostensibly provides better adhesion of the seal to the surface portion of wood.

The use of ammonium soaps appears to be more effective than the use of other soaps as the ammonia is apparently readily lost by decomposition of the ammonium soaps with subsequent formation of the more durable resin base.

Calcium stearate can be replaced by aluminum stearate or zinc stearate. However, these latter two compounds were found not to be as effective as the calcium stearate. Aluminum silicate and silica which have particle sizes of 25 microns were found to be effective replacements for the calcium stearate. These two compounds, though, were also found to cause serious settling and packing during storage of the composition.

With regard to the use of PAROIL 170 LV, it was found that chlorinated paraffins of low viscosity in general could be dissolved in fairly large amounts of methanol and thereby replace the PAROIL 170 LV.

Other variations in the composition of the present invention include varying the amounts of WATCHUNG RED B and the pthalocyanine blue pigment, depending upon the colour of the visible mark left on the surface portion of the wood which was desired. As well, other pigments may be used in place of the WATCHUNG RED, pthalocyanine blue pigment, or the titanium dioxide. Grades of rosin other than MIRARES Resin may be used. However, other grades of rosin were often found to contain more alcohol insoluble material. Such insoluble material causes caking and plugging of the spray equipment, particularly in cold weather.

Other modifications and variations of the composition within the scope of the invention will readily occur to those skilled in the art. The invention is not to be construed as limited to either embodiment described above but is to be afforded a full scope set forth in the appended claims.

We claim:

1. An all-weather wood marking and sealing composition comprising:
    (a) 40% to 90% by weight of an alcohol selected from the group consisting of methanol and ethanol;
    (b) 0.2% to 4.0% by weight of a water insoluble sealing means dispersed in said alcohol, said sealing means comprising an alkyl ether of cellulose;
    (c) 2% to 60% by weight of a water insoluble wood adhesive means dissolved in said alcohol, said wood adhesive means selected from the group consisting of rosin, shellac, benzoin, colophony, copal, damar and vinsol;
    (d) 0.1% to 15% by weight of methyl abietate;
    (e) 0.5% to 15% by weight hydrophobic silica, said hydrophobic silica having substantially 0.7 millimol of methyl groups chemically bonded to silica per 100 square meters of surface area of said hydrophobic silica;
    (f) 0.2% to 30% by weight of a salt of stearic acid, said salt being selected from the group consisting of calcium stearate, aluminum stearate, magnesium stearate, and zinc stearate; and
    (g) water insoluble pigment.

2. A composition according to claim 1, wherein the alkyl ether of cellulose is an ethyl ether of cellulose having an ethoxy content between 45% to 49% by weight.

3. A composition as in claim 1 or 2, wherein said wood adhesive means is a soap of said wood adhesive means.

4. A composition according to claim 1, wherein said pigment comprises 0.1% to 10% by weight of titanium dioxide.

5. A composition according to claim 4, additionally comprising 0.001% to 2.0% by weight of 2-N-octyl-4-isothiazolin-3-one, and 0.1% to 40% by weight of a low viscosity chlorinated paraffin having a chlorine content of 68% to 70% by weight.

6. A composition according to claim 4, 5 or 1, additionally comprising 0.1% to 60% by weight of the ammonium soap of said wood adhesive means, dissolved in said alcohol.

7. An all-weather wood marking and sealing composition comprising:

| Component | Weight or Volume | |
|---|---|---|
| Highly refined rosin | 19.5 | kg. |
| Methanol | 109 | liters |
| Hydrophobic silica | .907 | kg. |
| Pthalocyanine Blue Pigment | 1.13 | kg. |
| Ethyl Cellulose (Medium viscosity - ethoxy content 47.5% - 49% weight | 1.70 | kg. |
| Ethyl Cellulose (Viscosity 10 C.P.S. type | 2.84 | kg. |
| Calcium Stearate | .306 | kg. |
| Ammonium Hydroxide (28% by weight water solution) | 1.075 | liters |
| Titanium Dioxide | 2.95 | kg. |
| Methyl Abietate | 3.69 | kg. |

8. An all-weather wood marking and sealing composition comprising

| Component | Weight or Volume | |
|---|---|---|
| Highly refined rosin | 31.0 | kg. |
| Methanol | 251.0 | kg. |
| $C_{11}H_{16}Cl_8$ | 32.0 | kg. |
| Hydrophobic silica | 3.0 | kg. |
| Metal precipitated azo pigment of beta-hydroxynapthoic acid derived from permanent red dye | 4.0 | kg. |
| Ethyl Cellulose (Medium viscosity 100 C.P.S. type) | 9.0 | kg. |
| 2-N-octyl-4-isothiazolin-3-one | 0.6 | kg. |
| Calcium Stearate | 10.0 | kg. |
| Ammonium Hydroxide (28% by weight solution in water) | 1.0 | liter |
| Titanium Dioxide | 1.0 | kg. |
| Methyl Abietate | 5.0 | kg. |

* * * * *